(12) United States Patent
Häuser et al.

(10) Patent No.: US 12,398,795 B2
(45) Date of Patent: Aug. 26, 2025

(54) ACTUATING DRIVE COMPRISING A GUIDING ELEMENT

(71) Applicant: Minebea Mitsumi Inc., Nagano (JP)

(72) Inventors: Eric Häuser, Villingen-Schwenningen (DE); Felix Blaser, Villingen-Schwenningen (DE); Giovanni Biancuzzi, Freiburg im Breisgau (DE)

(73) Assignee: MINEBEA MITSUMI, INC., Nagano (JP)

( * ) Notice: Subject to any disclaimer, the term of this patent is extended or adjusted under 35 U.S.C. 154(b) by 0 days.

(21) Appl. No.: 18/421,460

(22) Filed: Jan. 24, 2024

(65) Prior Publication Data

US 2024/0255048 A1 Aug. 1, 2024

(30) Foreign Application Priority Data

Jan. 27, 2023 (DE) .......................... 102023101989.9

(51) Int. Cl.
| | | |
|---|---|---|
| *F16H 57/025* | (2012.01) | |
| *F16H 57/00* | (2012.01) | |
| *F16H 57/02* | (2012.01) | |
| *F16H 57/023* | (2012.01) | |

(52) U.S. Cl.
CPC ....... *F16H 57/0037* (2013.01); *F16H 57/025* (2013.01); *F16H 57/0031* (2013.01); *F16H 2057/02034* (2013.01); *F16H 2057/0235* (2013.01)

(58) Field of Classification Search
CPC ............... F16H 57/0037; F16H 57/025; F16H 57/0031; F16H 2057/02034; F16H 2057/0235; F16H 1/20; F16H 57/021; F16H 2057/0216; H02K 7/116
See application file for complete search history.

(56) References Cited

U.S. PATENT DOCUMENTS

2001/0049324 A1* 12/2001 Wallace ............. A63B 21/0783
  482/106
2021/0351682 A1  11/2021 Mellere
2022/0037959 A1*  2/2022 Schneider ................ H02K 7/12

FOREIGN PATENT DOCUMENTS

| | | |
|---|---|---|
| DE | 102014107900 | 12/2014 |
| DE | 102017200425 | 7/2017 |
| DE | 102020120250 | 2/2022 |
| JP | 2015-23761 | 2/2015 |
| JP | 2018-78753 | 5/2018 |

* cited by examiner

Primary Examiner — Victor L MacArthur
(74) Attorney, Agent, or Firm — Grossman, Tucker, Perreault & Pfleger, PLLC

(57) ABSTRACT

The invention relates to an actuating drive and to a guiding element for use in an actuating drive. The actuating drive according to the invention includes an electric motor, comprising a rotor rotatably supported on a rotor axle and an output gear mechanically coupled to the rotor. The actuating drive further includes a guiding element comprising a guide configured to radially guide the output gear relative to an output axis. The guiding element also includes a first axle receiver configured to receive a distal end of the rotor axle. The guiding element also includes a second axle receiver configured to receive a central portion of the transmission axle.

7 Claims, 5 Drawing Sheets

ACTUATING DRIVE COMPRISING A GUIDING ELEMENT

FIELD

The invention relates to an actuating drive.

BACKGROUND

Small electric motors, such as brushless DC motors (BLDC motors) are used, among other things, in the automotive industry and in automation engineering, for example as a servo motor, a fan motor or as a drive for actuators, such as flap actuators or valves, for example ball or needle valves. To control and monitor such actuators they can be provided with sensors to determine motor parameters, such as the rotor position, the rotor speed or the position of an actuated component coupled to the rotor.

An actuating drive can have, for example, a Hall sensor configured to measure a strength and/or direction of a magnetic field. A magnet can be attached to a rotatable element of the actuating drive, for example on an output gear. The Hall sensor can be arranged in the vicinity of the output gear to measure the magnetic field generated by the magnet. When the output gear is moved, the magnetic field changes at the location of the sensor. The measured magnetic field can thus be used to determine the angular rotation position of the output gear and, as the case may be, the position of an actuated component coupled therewith.

To support the output gear, the actuating drive can comprise a guide which can be, for example, in contact with a working surface of the output gear to radially and/or axially guide the latter relative to the rotation axis. Due to the compact design of small electric motors, space is often limited within the housing of the electric motor. This can lead to difficulties in arranging both the guide and the sensor in the direct vicinity of the output gear. To drive the output gear the output gear must also be mechanically coupled to a motor unit of the actuating drive, for example by means of a transmission, which also needs space.

SUMMARY

It is therefore an object to provide an actuating drive having a compact structure, enabling the arrangement of a sensor in the vicinity of an output gear and ensuring firm guiding of the output gear and further compound gears.

An actuating drive is provided comprising an electric motor comprising a rotor rotatably supported on a rotor axle, and an output gear mechanically coupled to the rotor. The actuating drive also includes a transmission, which is configured to mechanically couple the output gear to the rotor. The transmission can be formed, for example, as a reduction transmission, and can have a reduction gear ratio in the range of 1:200 to 1:2000, in particular, in the range of 1:300 to 1:800. The actuating drive also includes a guiding element comprising a guide, wherein the guide is configured to radially guide the output gear relative to an output axis.

The electric motor can be, for example, an electronically commutated electric motor, for example a stepper motor or a brushless DC motor. In other examples, the electric motor can be formed as a mechanically commutated DC motor or as an AC motor. The electric motor can also comprise a stator, wherein the rotor can be arranged within the stator as an internal rotor.

The rotor axle is a physical axle, for example a cylindrical rod, on which the rotor is rotatably supported. The rotor can include, for example, a working surface on its inner circumference, which is in contact with the outer surface of the rotor axle to guide the rotor in a direction radial with respect to the rotor axle. A first or proximal end of the rotor axle can be arranged, for example, in a respective receiver in a housing of the actuating drive, for example in a bottom plate of the housing. For receiving the distal end of the rotor axle opposite the proximal end, the guiding element includes a first axle receiver. The distal end of the rotor axle can be arranged in the first axle receiver of the guiding element. The rotor axle can be fixed in a rotation-resistant manner at at least one point, for example at least two points, for example, in the first axle receiver of the guiding element and/or a receiver within the housing.

The output gear is mechanically coupled to the rotor via the transmission, which is for example formed as a reduction transmission, so that a rotary motion of the rotor is converted to a rotary motion of the output gear. The output gear can be configured to be mechanically coupled to an actuated component, for example to convert a rotary motion of the output gear to a movement of the actuated component. To do this, the output gear can include an output shaft having a suitable engagement profile, wherein the output shaft can be configured, in particular, as a hollow shaft and the engagement profile can be arranged on the inner and/or outer circumference of the output shaft. The output gear can be supported to be rotatable about the output axis, for example in a corresponding bearing in a housing lid of the actuating drive.

The guiding element includes a guide to radially guide the output gear relative to the output axis. The guide can be adapted to enable a rotatory motion of the output gear about the output axis, but to prevent a movement of the output gear in a direction radial with respect to the output axis. For this purpose, the guide can include one or more contact surfaces, each of which is adapted to come into contact with a corresponding working surface of the output gear. The contact surfaces can be, for example azimuthal segments of a cylinder, the cross-sectional area of which respectively extends along a circular arc about the output axis. In an example, the guide has a cylindrical contact surface, which extends completely about the output axis in the circumferential direction. For example, the output axis extends in parallel to the rotor axle, i.e. in parallel to a rotation axis of the rotor.

If not otherwise indicated, in the present application, the term "axis" relates to a geometric or imaginary (rotation) axis in the mathematical sense, about which a rotary movement is carried out or is to be carried out, which, however, does not necessitate the presence of a physical axle. The term "axle", however, relates to a physical axle, such as, for example, a cylindrical rod which can be adapted, for example, to support an element to be rotatable about a corresponding (rotation) axis.

The transmission can include a plurality of compound gears mechanically coupled to each other and to the output gear to transmit a rotary motion of the rotor to the output gear. The compound gears can be formed, for example, as gears meshing with each other. For example, each compound gear includes a gear and a pinion connected to the gear in a manner resistant to rotation, which meshes, for example, with the gear of a further compound gear or with the output gear. At least one of these compound gears can be rotatably supported on the rotor axle, for example in such a manner that the corresponding compound gear has the same rotation axis as the rotor. The compound gear rotatably supported on the rotor axle can have an opening, for example, through which the rotor axle extends. The rotor axle can have one or more axial guides adapted to axially guide the rotor and/or the compound gear rotatably supported on the rotor axle, i.e. to prevent any movement along the rotor axle. In other examples, the rotor axle can be devoid of any axial guides, in which case it is formed, for example, as a simple cylindrical rod.

At least one of the compound gears, for example two or more compound gears are rotatably supported on a transmission axle which is arranged offset with respect to the rotor axle, for example in such a manner that the compound gears rotatably supported on the transmission axle have a rotation axis different from the rotor rotation axis. The transmission axle is for example parallel to the rotor axle. One of the compound gears rotatably supported on the transmission axle can mesh with the output gear connected to the rotor. Alternatively or additionally, one of the compound gears rotatably supported on the transmission axle can mesh with the output gear.

The transmission axle can be arranged in the housing of the actuating drive in a manner resistant to rotation, for example in corresponding receivers in a bottom plate and in a lid of the housing. A first or proximal end of the transmission axle can be arranged, for example, in a corresponding receiver in a housing of the actuating drive, for example in a bottom plate of the housing. The distal end of the transmission axle opposite the proximal end can be arranged in a corresponding receiver in a housing of the actuating drive, for example in a lid of the housing. The transmission axle can be fixed in a manner resistant to rotation at at least one point, for example at least two points, for example in a receiver in the housing. A length of the transmission axle is longer than a length of the rotor axle. A diameter of the transmission axle for example corresponds to a diameter of the rotor axle. To achieve high bending stiffness of the transmission axle, the transmission axle can have a greater diameter than the shorter rotor axle. A maximum diameter is limited, in particular, by a structural space provided. The transmission axle can be arranged in a direction radial with respect to the output axis outside of the outer circumference of the output gear, for example in such a manner that the transmission axle extends besides the outer circumference of the output gear and extends from the rotor side beyond an end face of the output gear facing away from the rotor.

The guiding element further includes the first axle receiver adapted to receive the distal end of the rotor shaft. The first axle receiver can have, for example, an opening in the guiding element, in which the distal end of the rotor axle can be arranged, or a protrusion which can be arranged in the distal end of the rotor axle. In an example, the first axle receiver includes a recess adapted to be fitted onto the rotor axle. For example, the first axle receiver is adapted to receive the distal end of the rotor axle in a manner resistant to rotation, for example to prevent any transmission of the rotary motion of the rotor to the rotor axle. The distal end of the rotor axle can be pressed, for example, into the first axle receiver (or vice-versa), or can be adhesively glued, threaded, hot caulked or welded thereto. Alternatively or additionally, the first axle receiver can include a fastener adapted to engage a corresponding counterpart on the rotor axle to receive the rotor axle in a manner resistant to rotation, for example an engagement profile, such as an internal or external hexagonal shape or round shape on an inner and outer circumference of the guiding element, respectively.

For example, the first axle receiver of the guiding element is adapted to axially guide the compound gear rotatably supported on the rotor axle. To achieve this, the first axle receiver can have a contact surface which extends, for example, perpendicular to the longitudinal direction of the rotor axle and is adapted to come into contact with the end-side working surface of the compound gear. In an example, the first axle receiver has a cylindrical protrusion arranged in an end-side recess of the compound gear, for example, in an end-side recess of a gear or a pinion of the compound gear, to axially and, as the case may be, also radially guide the compound gear. Alternatively or additionally, the compound gear rotatably supported on the rotor axle can also be in contact with the rotor or a shaft connected to the rotor to axially guide the compound gear and/or the rotor. In particular, the compound gear, can have an end-side contact surface adapted to come into contact with a corresponding working surface of the rotor or the shaft connected to the rotor. In particular, the compound gear, for example, the gear of the compound gear, can have an end-side recess adapted to receive and rotatably support a distal end of the rotor or the shaft connected to the rotor.

In addition to the first axle receiver, the guiding element further includes a second axle receiver adapted to receive a central portion of the transmission axle. The second axle receiver can include, for example, a through opening in the guiding element, through which the transmission axle can extend. For example, the second axle receiver is adapted to receive the central portion of the transmission axle situated between the distal end and the proximal end of the transmission axle, for example to prevent deformation, in particular bending, of the transmission axle. The transmission axle can be pushed into the second axle receiver to a point, for example, so that the central portion of the transmission axle is arranged directly within the second axle receiver. The transmission axle can be pressed, in particular, into the axle receiver or adhesively glued or welded to it. The second axle receiver is arranged in the axial direction, in particular, between a first compound gear rotatably supported on the transmission axle, which meshes with an input gear connected to the rotor, and a second compound gear rotatably supported on the transmission axle, which meshes with the output gear. The second axle receiver is thus adapted, in particular, to support the transmission axle between the first compound gear rotatably supported on the transmission axle, which meshes with an input gear connected to the rotor, and a second compound gear rotatably supported on the transmission shaft, which meshes with the output gear and to at least largely, and for example completely, prevent bending of the transmission axle in this region.

The guide can have a circular opening in the guiding element, wherein the opening extends, for example, along the output axis through the guiding element. The opening can be adapted, for example, to receive a shaft connected to the output gear, in particular a shaft arranged on a side opposite the output gear and, for example, forming a backside extension of the output shaft. An inner circumference of the opening can form a contact surface of the guide and can be adapted to come into contact with an outside of the shaft to radially guide the latter and thus also the output gear relative to the output axis.

In an example, the guiding element is arranged between the rotor and the output gear as seen in the direction of the output axis, i.e. in a projection onto the output axis, the guiding element is between the rotor and the main body of the output gear, for example, in such a manner that both end sides of the output gear come to lie beyond the guiding element when seen from the side of the rotor. The rotor axle can be arranged offset with respect to the output axle, i.e., so that the rotor and the output gear have different rotation axes, wherein the rotation axes of the rotor and the output gear can be parallel to each other. In particular, the rotor axle is arranged inside of an outer circumference of the output gear as seen in a direction radial to the output axis, for example so that the rotation axis of the rotor extends through the output gear as an extension of the rotor axle. Correspondingly, the first axle receiver of the guiding element can also be arranged inside of the outer circumference of the output gear as seen in a direction radial to the output axis, for example in the vicinity of an end face of the output gear. A distance between the output axis and the rotor axle in the direction radial to the output axis can be, for example, between 50% and 95%, in an example between 70% and 90%, of an outer radius of the output gear.

The actuating drive can further include a magnet connected to the output gear in a rotation-resistant manner, for example to be able to determine the position of the output gear or an actuated component coupled therewith. The magnet can be attached, for example, to the output gear, or for example to a shaft connected to the output gear, in particular a shaft opposite the output shaft.

For example, the magnet is arranged in the actuating drive in such a manner that the output axis of the output gear extends through the magnet. The magnet can be arranged, for example, on an end side of the shaft facing away from the output gear, for example in an end-side recess of the shaft. The magnet can be attached to the output gear or shaft by means of a retainer, in particular an ultrasonically welded retainer, and/or can be adhesively glued to the output gear or the shaft. For example, the magnet is arranged on a side of the guiding element opposite the output gear, i.e. in such a manner that the guiding element is situated between the magnet and the main body of the output gear and the magnet is arranged, e.g., on the same side of the guiding element as the rotor.

The actuating drive can also include a magnetic field sensor adapted to determine the strength and/or the direction of a magnetic field generated by the magnet. The actuating drive can further include a control unit adapted to determine a position of the output gear or an actuated component connected to the output gear on the basis of the strength and/or direction of the magnetic field measured by the magnetic field sensor, for example a rotary angle of the output gear about the output axis. For example, the magnetic field sensor is arranged in the actuating drive in such a manner that the output axis extends through the magnetic field sensor. An arrangement of both the magnet and the magnetic field sensor on the output axis can make the determination of the position of the output gear less prone to errors with respect to a movement of the magnet and/or of the magnetic field sensor, for example, in the radial direction, and thus ensure higher precision when determining the position.

In an example, the plurality of the compound gears comprises a first, a second, and a third compound gear. In some examples, the transmission can have no further compound gears, i.e., the transmission consists of exactly three compound gears. Each of the three compound gears can include a gear and a pinion connected to the gear in a manner resistant to rotation, which can be integrally formed with the gear or can be attached to the latter, for example can be threadedly connected, adhesively glued and/or welded to it. The first compound gear can be rotatably supported on the transmission axle, wherein the gear of the first compound gear meshes with an input gear connected to the rotor. The second compound gear can be rotatably supported on the rotor axle, wherein the gear of the second compound gear meshes with the pinion of the first compound gear. The third compound gear can be rotatably supported on the transmission axle, wherein the gear of the third compound gear meshes with the pinion of the second compound gear. In other words, the compound gears are alternately arranged starting from the input gear of the rotor arranged on the rotor axle either on the transmission axle or on the rotor axle so that the transmission forms a rising zig-zag structure along the rotor and transmission axles starting from the rotor, in which each compound gear is arranged in a successively higher level and is thus coupled with at least one compound gear respectively arranged on a different axle. This enables a particularly compact transmission arrangement, in particular, in a plane perpendicular to the rotor axle so that the base area occupied by the actuating drive can be reduced. Each of the three compound gears can be arranged in such a manner that its gear faces the rotor while its pinion faces away from the rotor.

The pinion of the third compound gear can mesh with the output gear, that is the transmission can consist only of the three above-mentioned compound gears. In other examples, further compound gears can be interposed between the third compound gear and the output gear, wherein the further compound gears can also be arranged, as described above, in an alternating fashion on the rotor axle and the transmission axle.

The electric motor can include a stator surrounding the rotor, which can include, for example, a plurality of phase windings, adapted to generate a magnetic field varying with time to set the rotor formed as an internal rotor in a rotary movement about the rotor axle. For example, the transmission axle is arranged within an outer circumference of the stator. A distance between the rotor axle and the transmission axle can thus be smaller than a radius of the stator. In some examples, the transmission axle can extend through the stator. The transmission axle can be arranged, for example, in a space between two neighboring phase windings of the stator and/or within a back iron element of the stator. The transmission axle can extend, for example, through a slot insulation of the stator arranged between the phase windings. If the transmission axle is arranged in a space between two neighbouring phase windings of the stator and/or within a back iron element of the stator, or if the transmission axle extends through a slot insulation of the stator arranged between the phase windings, a maximum diameter of the transmission axle is limited by the structural space available within the stator. Due to the limited maximum diameter of the transmission axle, with a length of the transmission axle being longer than the length of the rotor axle, it is necessary to support the transmission axle by means of the second axle receiver of the guiding element in the radial direction to at least largely and for example completely prevent bending of the transmission axle during operation of the actuating drive.

The stator can be adapted to axially and/or radially guide a compound gear rotatably supported on the transmission axle. For this purpose, the stator can have a contact surface extending, for example, perpendicular to a longitudinal direction of the transmission axle and adapted to come into contact with an end side working surface of the compound gear or a shaft connected to the compound gear to axially guide the compound gear along the transmission axle. The contact surface can be, for example, a surface of a carrier element for the phase windings of the stator.

In some examples, the actuating drive can further include a printed circuit board on which, for example, a control unit for the electric motor and/or the magnetic field sensor can be arranged. The printed circuit board can be arranged between the rotor and the guiding element, wherein the rotor axle can extend through an opening or recess in the printed circuit board from the rotor to the axle receiver in the guiding element. In addition to the rotor axle, the transmission axle can also extend through an opening or recess in the printed circuit board, wherein the transmission axle can extend, starting from an axle receiver in a bottom of the housing of the actuating drive through the recess or opening in the printed circuit board and the second axle receiver of the guiding element to a further axle receiver in the lid of the housing of the actuating drive.

In an example, the rotor is arranged on a first side of the printed circuit board, while all of the compound gears are arranged on a second side of the printed circuit board opposite the first side. To achieve this, the printed circuit board can include a recess or opening through which the rotor axle and an input shaft connected to the rotor can extend, wherein the input shaft, at its distal end, includes a drive gear mechanically coupled to the transmission, for example, in the form of a corresponding engagement profile on an outer circumference of the input shaft. The printed circuit board can also include a further recess or opening, in which the transmission axle, and, as the case may be, a shaft connected to a compound gear, is arranged for support on the stator. The output gear and the guiding element can also be respectively arranged on the second side of the printed circuit board.

By providing a guiding element which includes both a guide for the output gear of the actuating drive and a first axle receiver for the rotor axle and a second axle receiver for the transmission axle, the present disclosure provides an actuating drive having both a compact structural size and firm guiding of the output gear and of the compound gears. Moreover, the guiding element can be adapted in such a manner that both a magnet connected to the output gear in a manner resistant to rotation and the magnetic field sensor can be arranged in the space between the guiding element and the rotor on the output axis, which allows precise determination of the position of the output gear despite the compact structural size. Moreover, a space-saving transmission arrangement can be implemented by means of a transmission axle extending in parallel to the rotor axle, thus further reducing the base area of the actuating drive.

Furthermore, a guiding element is provided for use in an actuating drive, which includes a plate-like main body. The main body includes an annular guide comprising, on its inner circumference, an inner contact surface adapted to come into contact with a rotatably supported element of the actuating drive and to radially guide the rotatably supported element relative to a rotation axis. The guiding element further includes a first axle receiver arranged on a side of the plate-like main body of the guiding element facing in the direction of a bottom of the housing of the actuating drive in the assembled state of the guiding element. The first axle receiver is adapted to receive a rotor axle of the actuating drive. The guiding element further includes a second axle receiver formed as a through opening in the plate-like main body of the guiding element. The second axle receiver is adapted to receive a central portion of the transmission axle and to support the central portion of the transmission axle in the radial direction. The guiding element further includes a plurality of positioning and/or fixing elements adapted to engage corresponding counterparts on a housing of the actuating drive to position and/or fix the guiding element within the housing.

The guiding element can be used, for example, as a guiding element in the actuating drive according to any of the examples described herein. The rotatably supported element can thus be an output gear or a shaft connected to the output gear, the rotation axis being an output axis of the output gear. The first axle receiver can be adapted to receive a rotor axle of the actuating drive. The second axle receiver can be adapted to receive a transmission axle of the actuating drive.

The annular guide can be formed, for example, by an opening having a circular cross-section, which extends through the plate-like main body of the guiding element, wherein the wall surface surrounding the opening forms the inner contact surface. The contact surface can extend completely about the rotation axis in the circumferential direction, and can be, for example, cylindrical. The contact surface can be adapted to prevent movement of the rotatably supported element perpendicular to the rotation axis.

The first axle receiver can be configured as described above for the actuating drive. The first axle receiver can include, for example, an opening or a recess adapted to receive the rotor axle. Alternatively or additionally, the first axle receiver can have a protrusion adapted to be arranged in a recess in the rotor axle. In some examples, the first axle receiver can include a fastener adapted to engage a corresponding counterpart on the rotor axle, for example, an engagement profile, to receive the rotor axle in a manner resistant to rotation.

The second axle receiver can be configured as described above for the actuating drive. The second axle receiver can include, for example, a through opening adapted to receive a central portion of the transmission axle. Alternatively or additionally, the second axle receiver can have a protrusion adapted to be arranged in a recess in the transmission axle. In some examples, the axle receiver can include a fastener adapted to engage a corresponding counterpart of the transmission axle, for example an engagement profile, to receive the transmission axle in a manner resistant to rotation.

The guiding element can include a plurality of positioning and/or fixing elements each arranged in a peripheral region of the plate-like main body. For example, the guiding element includes four positioning and/or fixing elements, which are arranged in a manner distributed over the external circumference of the plate-like main body of the guiding element. Each of the positioning and/or fixing elements can be formed, for example, as a nose facing towards a bottom of the housing in the assembled state of the guiding element, which is adapted to engage a corresponding counterpart on the housing of the actuating drive, for example, can be inserted or pressed into the latter. The positioning and/or fixing elements formed as noses can extend in parallel to the rotation axis. The positioning and fixing elements can further be adapted to ensure a minimum distance between the guiding element and a further element of the actuating drive. The further element of the actuating drive can be, for example, a printed circuit board. The positioning and/or fixing elements can have a length corresponding to the minimum distance and can be adapted to come into contact with the further element or a housing element.

The plate-like main body of the guiding element can include a receiving region adapted to receive a compound gear rotatably supported on the transmission axle. A bottom of the receiving region can include a contact surface adapted to come into contact with a compound gear received in the receiving region to guide it along the transmission axle. Alternatively or additionally, the bottom of the receiving region can have a further contact surface on a side facing away from the receiving region, adapted to come into contact with a second compound gear rotatably supported on the transmission axle to axially guide it along the transmission axle. The plate-like main body of the guiding element, in the region of the first axle receiver, can have a cylindrical protrusion adapted to be arranged in a recess on an end face of the gear rotatably supported on the rotor axle to axially guide the gear along the axle. The first axle receiver can have a recess arranged on an end face of the cylindrical protrusion and adapted to receive the rotor axle.

The actuating drive can be used, in particular, in a flap drive or valve drive driven by an electric motor. The flap drive or valve drive can be, for example, part of an air conditioning system of an automotive vehicle. For example, such a valve actuator can be provided for regulating a volume flow of refrigerant, such as a gas or a cooling liquid.

SHORT DESCRIPTION OF DRAWINGS

Further advantages can be derived from the following description of the drawing. In the drawing, an example is shown. The drawing, the description and the claims comprise numerous features in combination. The person skilled in the art will also suitably consider the features in isolation and will combine them to further suitable configurations.

In the drawings:

FIG. 6b shows an oblique perspective bottom view of the guiding element of FIG. 6a.

DESCRIPTION OF THE EXAMPLES

Figure 1:
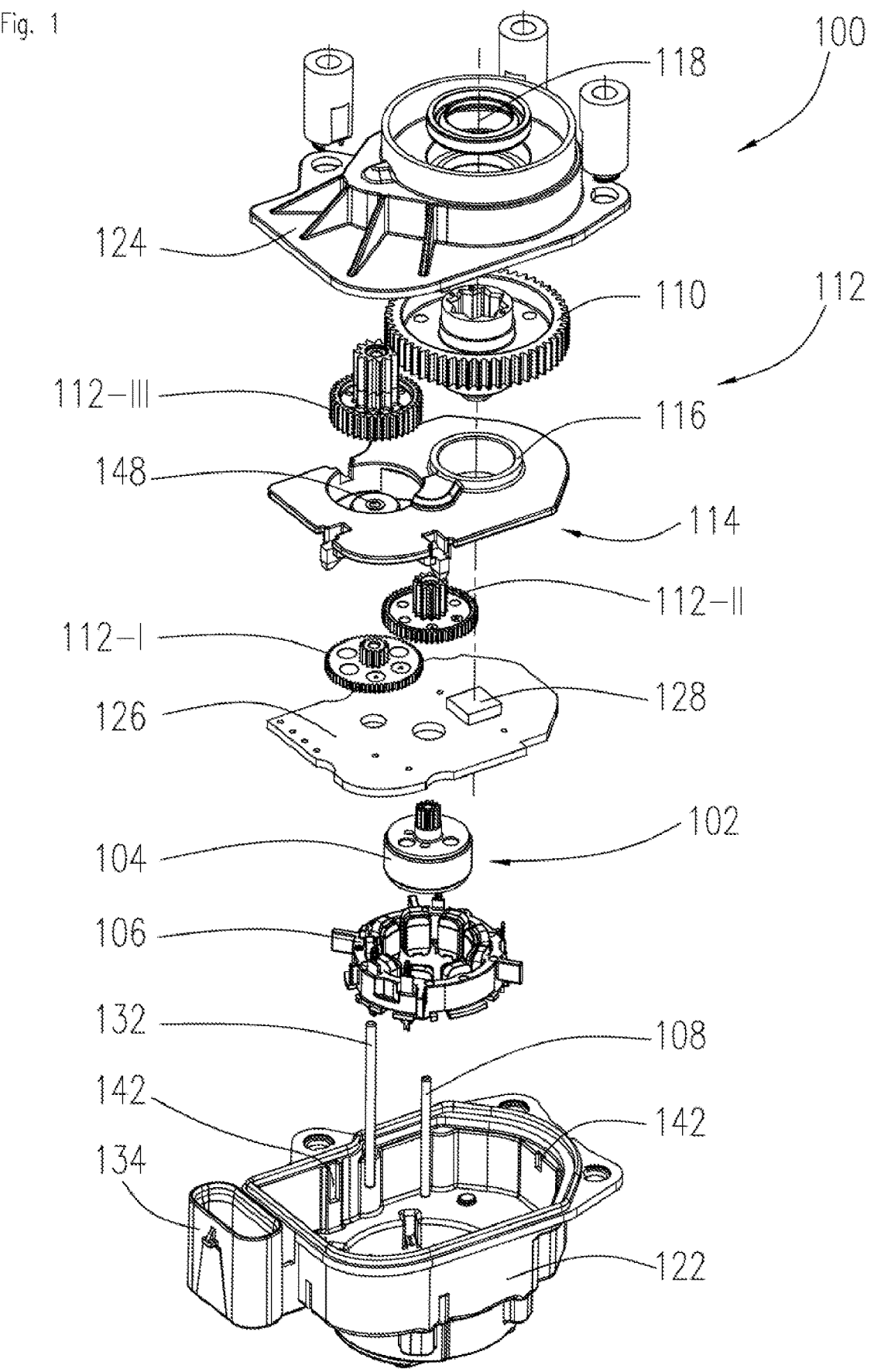
FIG. 1 shows an explosive view of an actuating drive in accordance with an example.
Figure 2:
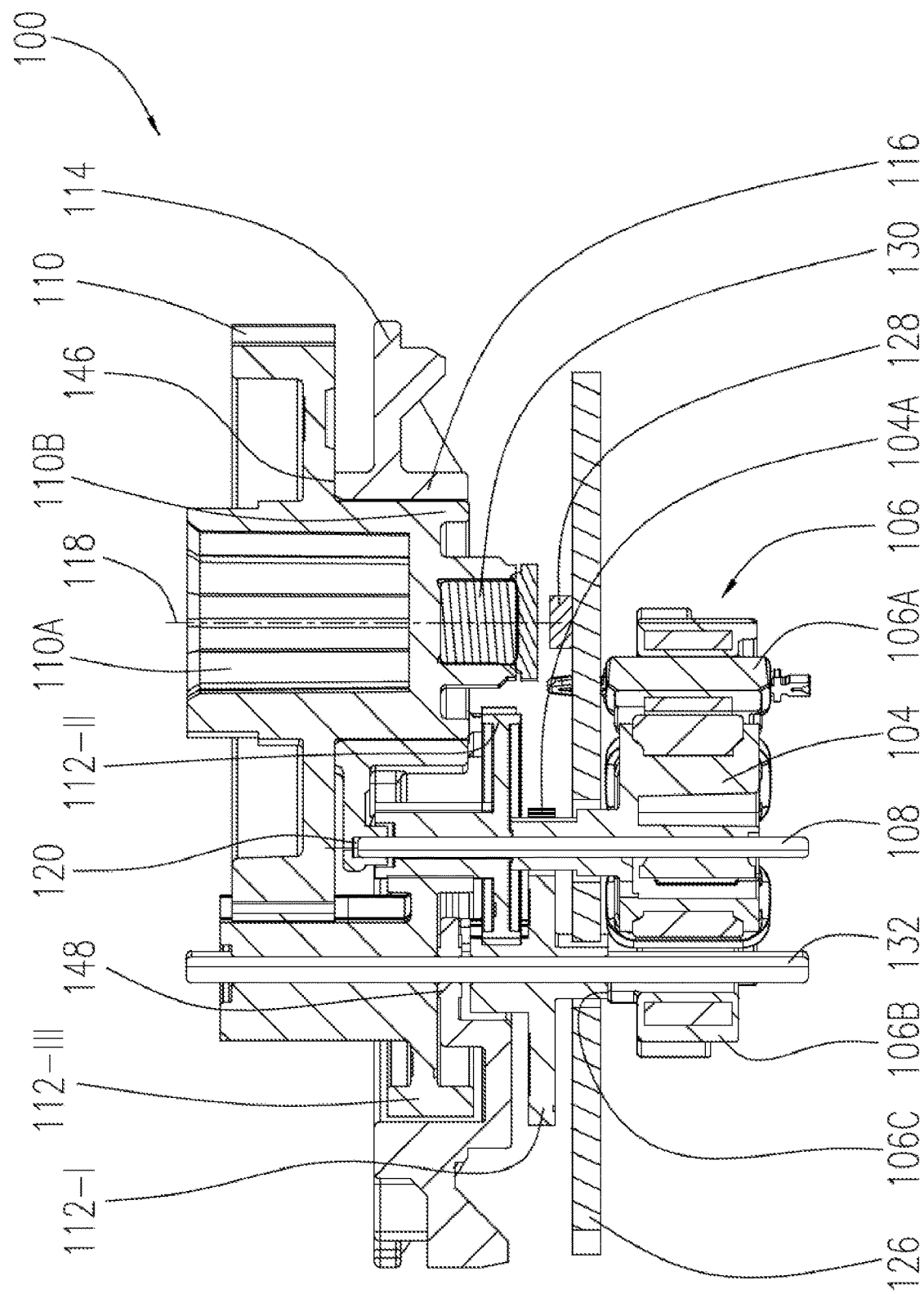
FIG. 2 shows a cross-sectional view of the actuating drive of FIG. 1 without a housing.
Figure 3:
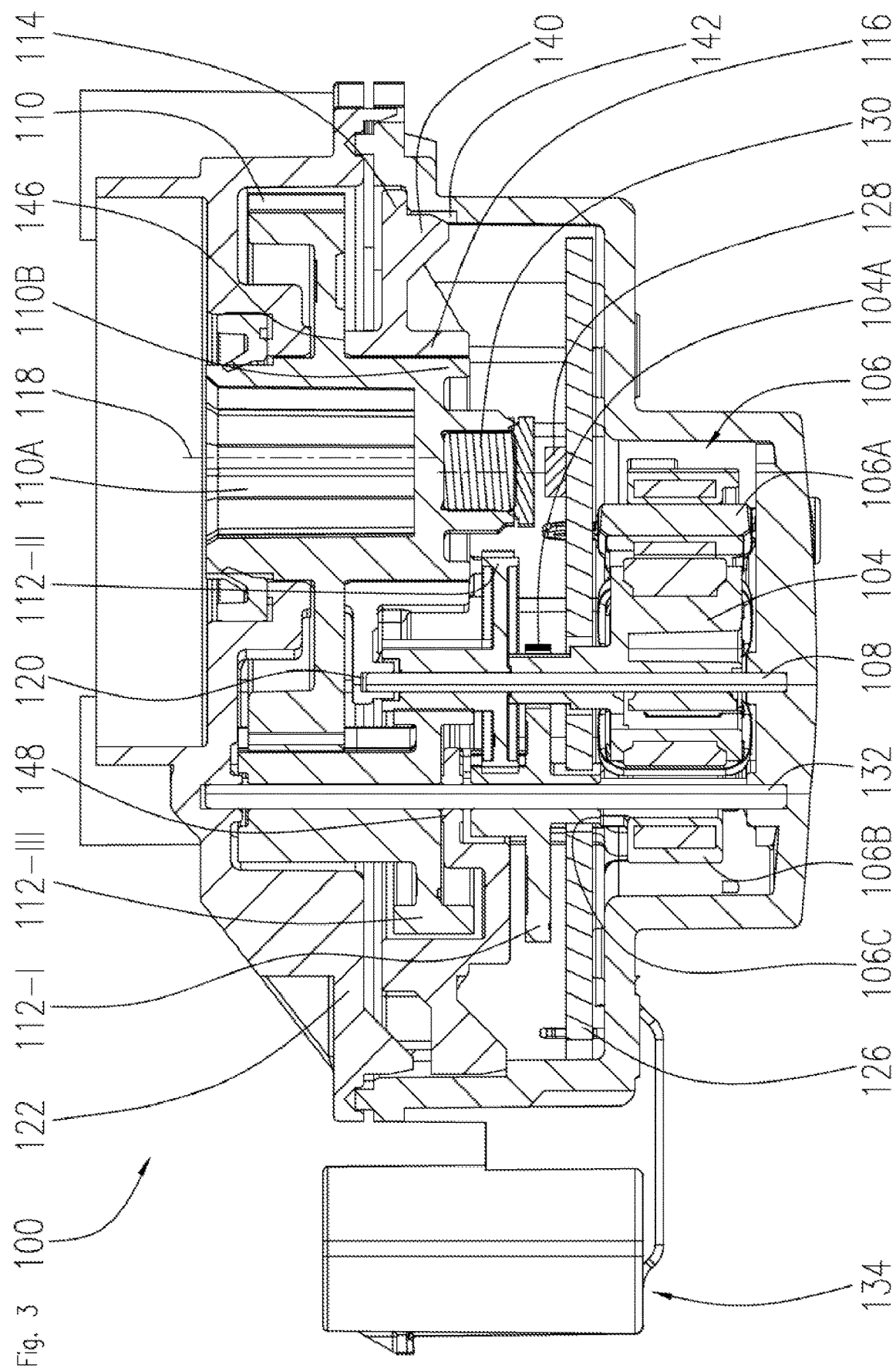
FIG. 3 shows a cross-sectional view of the actuating drive of FIG. 1 with the housing.
Figure 4:
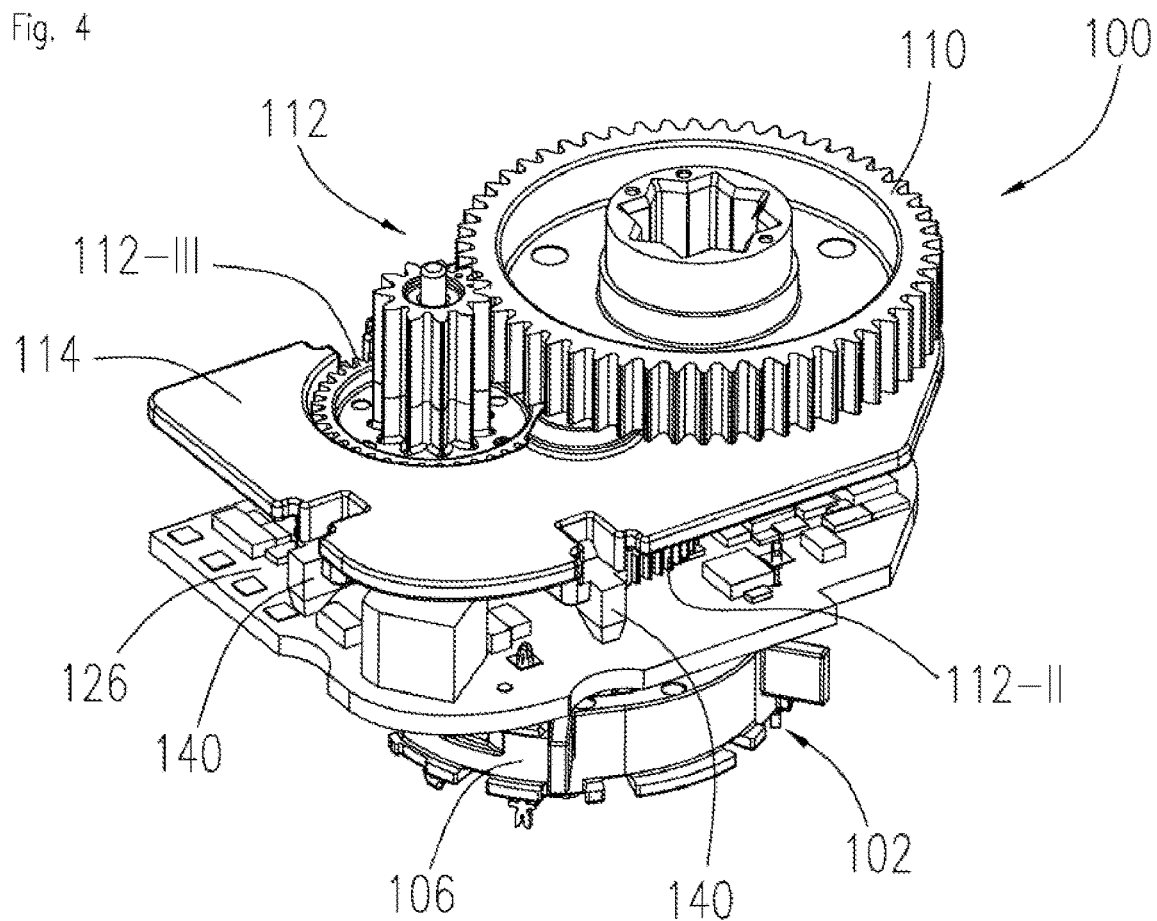
FIG. 4 shows a perspective view of the actuating drive of FIG. 1 without a housing.
Figure 5:
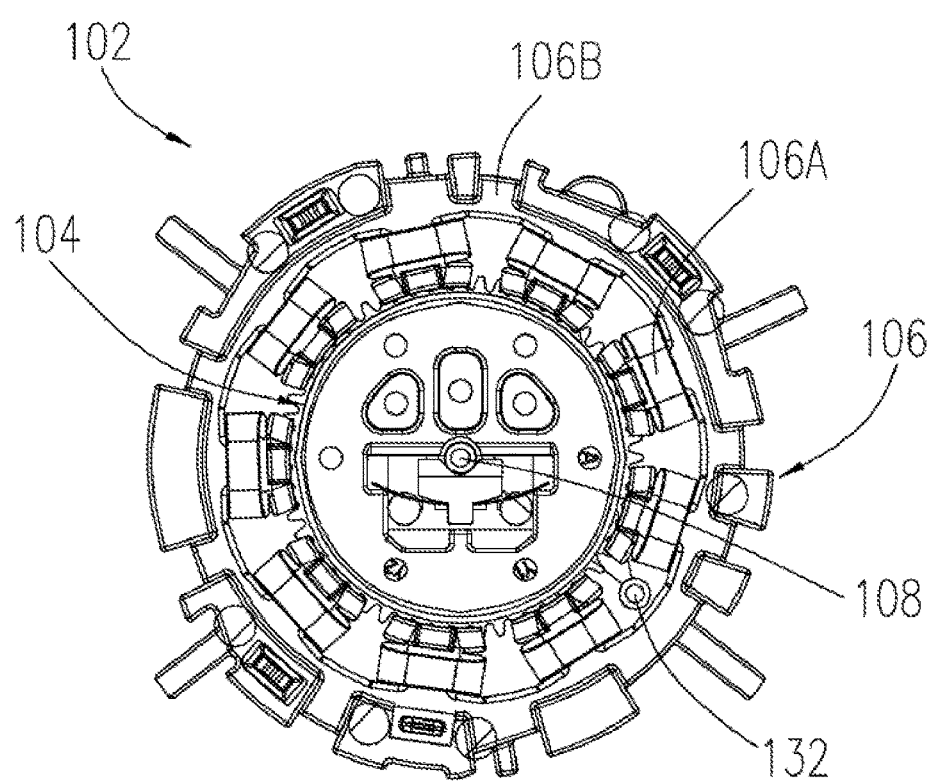
FIG. 5 shows a bottom view of the electric motor of the actuating drive of FIG. 1.

FIGS. 1 to 5 show an actuating drive 100 according to an example. FIG. 1 shows an explosive view of the actuating drive 100, FIG. 2 shows a cross-sectional view without the housing 122, 124, FIG. 3 shows a cross-sectional view of the housing 122, 124, and FIG. 4 shows a perspective view without the housing 122, 124. FIG. 5 shows a bottom view of the electric motor 102 of the actuating drive 100.

The actuating drive 100 includes an electric motor 102 comprising a rotatably supported rotor 104 and a stator 106 surrounding the rotor 104. In the example of FIGS. 1 to 5, the electric motor 102 is formed as a brushless DC motor, wherein the stator 106 includes a plurality of phase windings 106A arranged about the rotor 104. The rotor 104 is rotatably supported on a rotor axle 108, wherein the rotor axle 108 is formed as a cylindrical rod, and a proximal or bottom end of the rotor axle 108 is arranged in a corresponding receiver in a bottom plate of the housing 122 in a manner resistant to rotation.

The actuating drive 100 further includes an output gear 110 integrally formed with an output shaft 110A formed as a hollow shaft. The output shaft 110A includes an engagement profile on its inner circumference, via which the output gear 110 can be connected to an actuated component (not shown). The output gear 110 is mechanically coupled to the rotor 104 via a transmission 112, so that a rotary motion of the rotor 104 about the rotor axle 108 is converted to a rotary motion of the output gear 110.

The actuating drive 100 also includes a guiding element 114 comprising a guide 116 adapted to radially guide the output gear 110 relative to an output axis 118. For this purpose, the guide 116 includes, as discussed in more detail below with reference to FIGS. 6a and 6b, a circular opening 138 in the guiding element 114 adapted to receive a shaft 110B. The shaft 110B is connected to the output gear 110, for example is integrally formed with the output gear 110, and is arranged on the side of the output gear 110 opposite the output shaft 110A. In the example of FIGS. 1 to 5, the output axis 118 extends in parallel to the rotor axle 108 and thus to the rotation axis of the rotor 104. The guiding element 114 can be formed, for example, of metal and/or a plastic material, in particular a thermoplastic material, wherein the plastic material can be glass-fiber reinforced to increase the mechanical stability of the guiding element 114, as needed.

The guiding element 114 includes a first axle receiver 120 adapted to receive a distal or top end of the rotor axle 108. For this purpose, the first axle receiver 120 includes, as described in more detail below with reference to FIGS. 6a to 6b, a recess 120B which can be fitted on the rotor axle 108, for example in such a manner that the rotor axle 108 is pressed into the recess 120B in a manner resistant to rotation and/or is hot caulked or ultrasonically welded thereto.

The above-mentioned components of the actuating drive 100 are arranged in a housing 122 having a lid 124, wherein the lid 124 includes an opening through which the engagement profile of the output shaft 110A is accessible from the outside. The guiding element 114 is arranged between the rotor 104 and the output gear 110 in the direction of the output axis 118, wherein the shaft 110B extends from the bottom end face of the output gear 110 through the guiding element 114 towards the rotor 104.

The actuating drive 100 further includes a printed circuit board 126 arranged between the guiding element 114 and the rotor 104. A magnetic field sensor 128 is arranged on the printed circuit board 126, wherein the magnetic field sensor 128 can be, for example, a two-dimensional or three-dimensional Hall sensor. The magnetic field sensor 128 is adapted to measure the strength and/or direction of a magnetic field which is produced by a magnet 130 fixed in a manner resistant to rotation in an end side recess in the shaft 110B connected to the output gear 110 by means of a retainer. Both the magnetic field sensor 128 and the magnet 130 are arranged in such a manner that the output axis 118 extends through the magnetic field sensor 128 and the magnet 130. In an analogous fashion, in other examples, an arrangement comprising a capacitive or inductive sensor can be provided, wherein an electrically conductive element is arranged on the end face of the output gear, for example in the end face recess of the output gear.

The transmission 112 of the actuating drive 100 includes a plurality of compound gears. In the example of FIGS. 1 to 5, the transmission consists of three compound gears 112-I, 112-II, 112-III, each including a gear facing the rotor 104 and a pinion facing away from the rotor 104, wherein the gear and the pinion are connected to each other in a manner resistant to rotation and can be integrally formed, for example.

A first compound gear 112-I is rotatably supported on a transmission axle 132, wherein the transmission axle 132 extends in parallel to the rotor axle 108 from a bottom receiver in the bottom plate of the housing 122 through an opening in the printed circuit board 126 to a top receiver in the lid 122. The first compound gear 112-I is arranged above the printed circuit board 126 and meshes with an input gear 104A arranged on the rotor axle 108. The input gear 104A is connected in a manner resistant to rotation to the rotor 104 arranged below the printed circuit board 126 via a shaft arranged in a further opening in the printed circuit board 126.

The pinion of the first compound gear 112-I meshes with the gear of a second compound gear 112-II, which is rotatably supported on the rotor axle 108 above the input gear 104A. The pinion of the second compound gear 112-II includes a recess at its top end face, in which a cylindrical protrusion 120A of the first axle receiver 120 is arranged, which is described in more detail below with reference to FIGS. 6*a* to 6*b*. This enables axial guiding of the second compound gear 112-II and of the rotor 104 with the input gear 104A along the rotor axle 108.

The pinion of the second compound gear 112-II meshes with the gear of a third compound gear 112-III which is rotatably supported on the transmission axle 132 above the first compound gear 112-I. The pinion of the third compound gear 112-III, in turn, meshes with the output gear 112 and is in contact with a protrusion on the lid 122 at its end face, which thus provides a top axial guide for the first compound gear 112-I and the third compound gear 112-III along the transmission axle 132. At the same time, the stator 106, at its top side, has a contact surface 106C in contact with an end-side working surface of a shaft, which is connected to the first compound gear 112-I and extends along the transmission axle 132 through the corresponding opening in the printed circuit board 126. The contact surface 106C of the stator 106 thus forms a bottom axial guide for the first compound gear 112-I and the third compound gear 112-III along the transmission axle 132.

The rotor axle 108 is arranged in such a manner that it is within an outer circumference of the output gear 110 in the direction radial to the output axis 118, that is that the rotor axle 108 is closer to the output axis 118 than the outer circumference of the output gear 110. The first axle receiver 120 of the guiding element 114 arranged below the end face of the output gear 110 forms a top retaining point for the rotor axle 108 so that the rotor axle 108 can be firmly held within the housing 122 even without contact to the lid 122.

The transmission axle 132 is arranged within an outer circumference of the stator 106 and extends, as can be seen in FIGS. 3 and 5, from the printed circuit board 126 through a space between two neighboring phase windings 106A of the stator 106 to the bottom plate of the housing 122. Correspondingly, the transmission axle 132 is arranged within a magnetic back iron element 106*b* surrounding the phase windings 106A in the circumferential direction. Due to this arrangement of the transmission axle 132, a maximum diameter of the transmission axle 132 is limited to the magnetic back iron element 106*b* surrounding the phase windings 106A in the circumferential direction, in which the transmission axle 132 is arranged. This limited diameter of the transmission axle 132, in combination with the length of the transmission axle 132, which is greater than the length of the rotor axle 108, leads to the necessity of preventing bending of the transmission axle 132 during operation of the actuating drive 100.

To prevent bending of the transmission axle 132 during operation of the actuating drive 100, the guiding element 114, in addition to the first axle receiver 120, further includes a second axle receiver 148 adapted to receive a central portion of the transmission axle 132. The second axle receiver 148 includes a through opening 150 in the guiding element 114 through which the transmission axle 132 can pass. For example, the second axle receiver 148 is adapted to receive the central portion of the transmission axle 132 disposed between the distal end and the proximal end of the transmission axle 132. The transmission axle 132 is introduced into the second axle receiver 148, or the second axle receiver 148 is slid onto the transmission axle 132 up to a point so that the central portion of the transmission axle 132 is directly arranged in the second axle receiver 148. The second axle receiver 148, in the assembled state, is arranged, in the axial direction, between the first compound gear 112-I and the third compound gear 112-III. Such placement of the rotor axle 108 and the transmission axle 132, in combination with the alternating arrangement of the compound gears 112-I to 112-III on the rotor axle 108 and the transmission axle 132, enables space-saving arrangement of the components of the actuating drive 100 only occupying a small base area perpendicular to the output axis 118. All the compound gears 112-I to 112-III are arranged on the side of the printed circuit board 126 facing away from the rotor 104, on which the output gear 110 is also situated.

The actuating drive 100 further includes a connection or connector 134 via which the printed circuit board 126 can be electrically contacted from the outside. To further reduce the base area occupied by the actuating drive 100, the connector 134 can extend in parallel to a sidewall of the housing 122 which, in turn, can be parallel to the rotor axle 108 and the output axis 118. The connector 134 can extend, as shown in FIG. 3, upwards from the level of the printed circuit board 126 to enable contacting of the actuating drive 100 from above. Alternatively, the connector 134 can also extend downwards from the level of the printed circuit board 126, for example, in parallel to the sidewall of the housing 122 surrounding the stator 106.

Figure 6A:
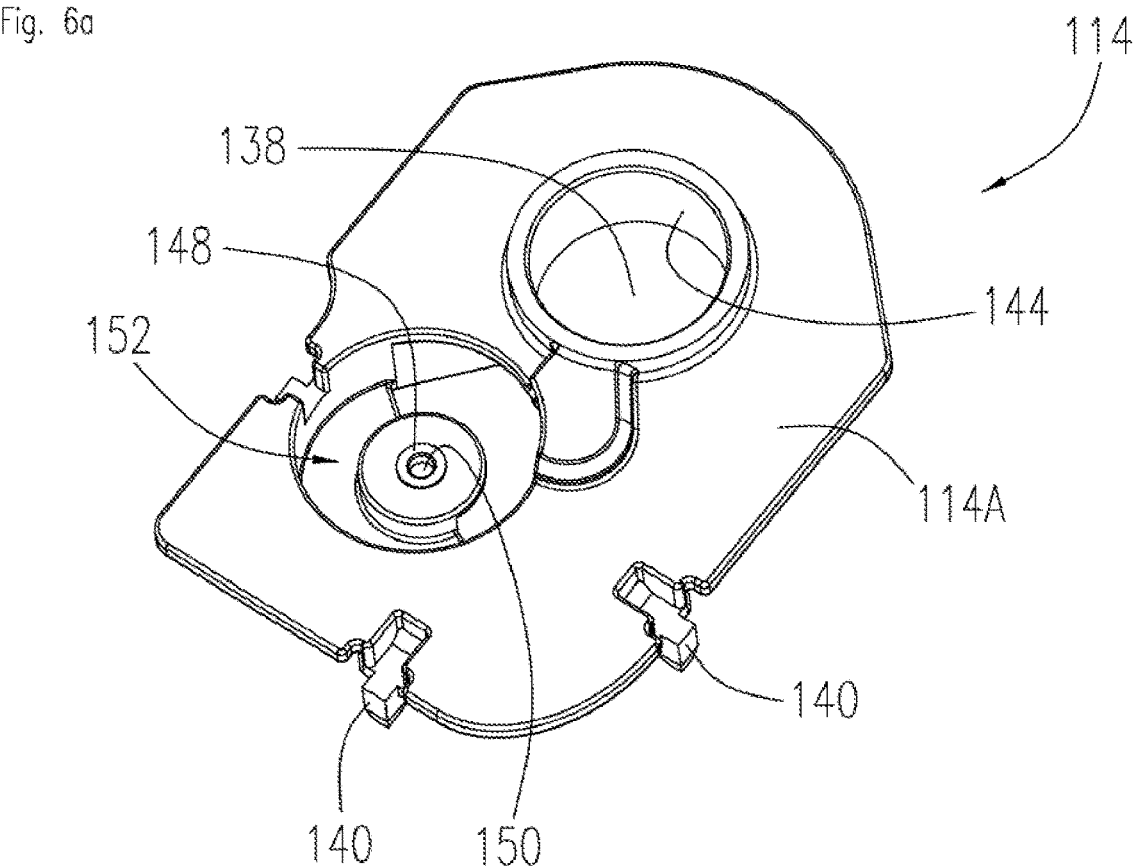
FIG. 6a shows an oblique perspective top view of a guiding element for use in an actuating drive according to an example.
Figure 6B:
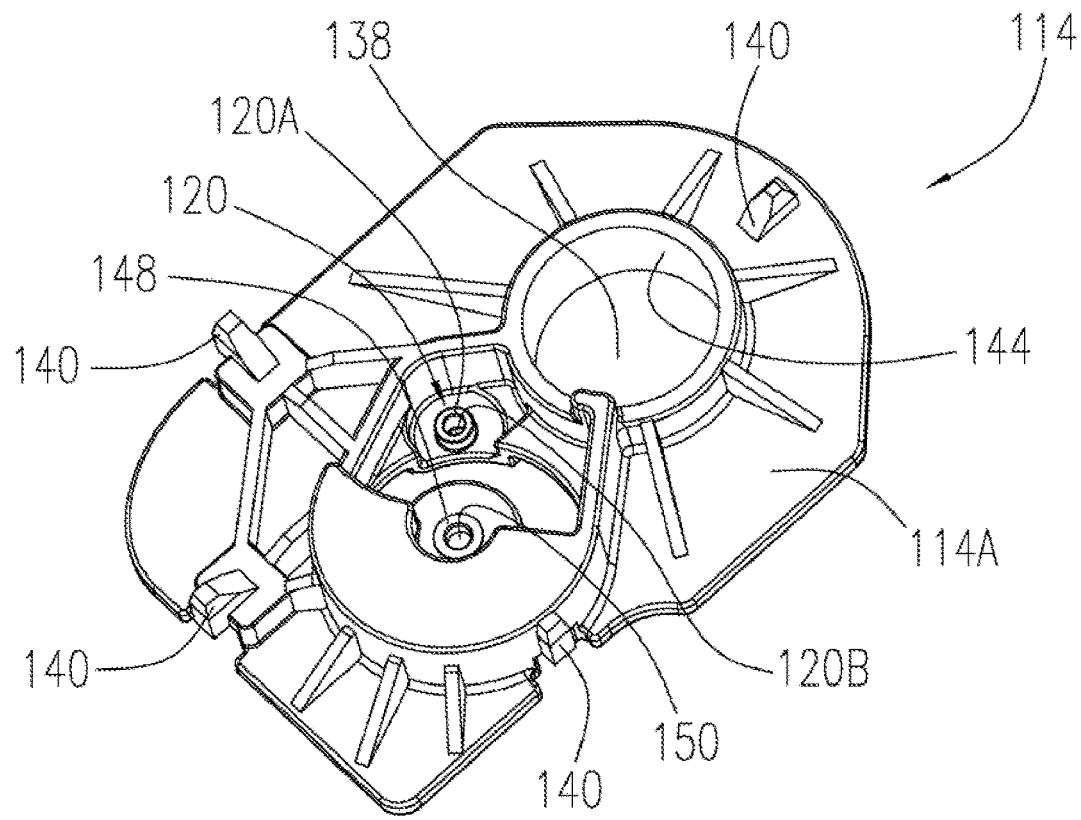

FIGS. 6*a* and 6*b* show a guiding element 114 for use with an actuating drive according to one example. In FIG. 6*b*, the guiding element 114 is shown in a perspective view obliquely from above, and in FIG. 6*b*, in a perspective view obliquely from below. The guiding element 114 can be used, for example, in the actuating drive 100 described above with reference to FIGS. 1 to 5, as a guiding element for the output gear 110, a receiver for the rotor axle 108 and a receiver for the transmission axle 132. Such use will be described in the following for exemplary illustration of the guiding element 114. Alternatively, the guiding element 114 can also be used in a different actuating drive, as a guiding element for a different rotatably supported element of an actuating drive and/or for receiving any other axle of an actuating drive.

The guiding element 114 includes a plate-like main body 114A, through which an opening 138 having a circular cross-section extends, adapted to receive a shaft 110B connected to the output gear 110. The opening 138 has a cylindrical contact surface 144 on its inner circumference adapted to come into contact with the outside of the shaft 110B and to rotatably support the shaft 110B and thus the output gear 110 about a rotary axis or output axis 118. The opening 138 in the guiding element 114 thus forms a guide 116 adapted to radially guide the shaft 110B and the output gear 110 relative to the output axis 118. The main body 114A, on its top side shown in FIG. 6*a*, includes an end-side contact surface 146 annularly extending about the output axis 118. The contact surface 146, as shown in FIG. 2, is adapted to come into contact with an end face of the output gear 110 connected to the shaft 110B and so to axially guide the output gear 110 relative to the rotary axis 118. The guiding element 114 thus forms both a radial and an axial guide for the output gear 110.

A first axle receiver 120 is arranged on the main body 114A adapted to receive the rotor axle 108 of the actuating drive 100 in a manner resistant to rotation. The first axle receiver 120 includes a cylindrical protrusion 120A arranged on a bottom side of the main body 114A extending downwards in parallel to the output axis 118. A recess 120B is arranged on a bottom end face of the cylindrical protrusion 120A into which a distal end of the rotor axle 108 can be pressed in a manner resistant to rotation. The cylindrical protrusion 120A is adapted as described above with reference for the actuating drive 100 to be arranged in a recess on an end face of a gear rotatably supported on the rotor axle 108, such as for example the second compound gear 112-II. The bottom end face of the cylindrical protrusion 120A can come into contact with a bottom surface of a recess on the end face of the second compound gear 112-II and thus axially guide the second compound gear 112-II along the rotor axle 108.

The plate-like main body 114A of the guiding element 114 further includes a receiving region 152 adapted to receive the third compound gear 112-III rotatably supported on the transmission axle 132. The receiving region 152 has a circular cross-section and extends starting from a top side of the main body 114A towards a bottom side of the main body 114A. The receiving region 152 is open at the top of the main body 114A so that the third compound gear 112-III can be introduced into the receiving region 152 from above. To allow meshing of the third compound gear 112-III with the pinion of the second compound gear 112-II, a bottom and also a circumferential wall of the receiving region 152 are formed to be discontinuous. At the bottom of the receiving region 152, a second axle receiver 148 is arranged. As shown in FIG. 3, the transmission axle 132 extends starting from a receiver in a bottom of the housing 122, through the first compound gear 112-I, through the second axle receiver 148 and through the third compound gear 112-III towards a receiver in the lid 124.

The guiding element 114 further includes a plurality of positioning and/or fixing elements 140 adapted to engage corresponding counterparts 142 in the housing 122 of the actuating drive to position and/or fix the guiding element 114 within the housing 122. The positioning and/or fixing elements 140 are each arranged on a peripheral region of the plate-like main body 114A. The guiding element 114 includes, by way of example, four positioning and/or fixing elements 140 which are arranged in a distributed manner over an outer circumference of the plate-like main body 114A of the guiding element 114. The positioning and/or fixing elements 140 are formed as noses facing towards a bottom of the housing 122 in an assembled state of the guiding element 114 adapted to engage, for example introduced or pressed into, counterparts 142 on the housing 122 of the actuating drive 100 formed as grooves extending in the axial direction.

LIST OF REFERENCE NUMERALS

100 actuating drive
102 electric motor
104 rotor
104A input gear
106 stator
106A phase winding
106B back iron element
106C contact surface of stator 106
108 rotor axle
110 output gear
110A output shaft
110B shaft of output gear 110
112 transmission
112-I first compound gear
112-II second compound gear
112-III third compound gear
114 guiding element
114A main body
116 guide
118 output axis/rotation axis
120 first axle receiver
120A cylindrical protrusion
120B recess
122 housing
124 lid
126 printed circuit board
128 magnetic field sensor
130 magnet
132 transmission axle
134 connector
138 opening in guiding element
140 positioning/fixing element
142 counterpart
144 inner contact surface
146 end-side contact surface
148 second axle receiver
150 through opening
152 receiving region

What is claimed is:

1. An actuating drive, comprising
   an electric motor, comprising a rotor rotatably supported on a rotor axle;
   an output gear mechanically coupled to the rotor;
   a transmission comprising a plurality of compound gears configured to mechanically couple the output gear to the rotor, wherein one of the compound gears is rotatably supported and mounted on the rotor axle, wherein two of the compound gears are rotatably supported on one transmission axle arranged offset with respect to the rotor axle, and wherein the transmission axle is of greater length than the rotor axle; and
   a guiding element comprising a guide configured to radially guide the output gear relative to an output axis, wherein the guiding element includes a first axle receiver configured to receive a distal end of the rotor axle, and a second axle receiver configured to receive a central portion of the transmission axle.

2. The actuating drive according to claim 1, wherein the second axle receiver includes a through opening configured to be slid onto the transmission axle up to said central portion of the transmission axle.

3. The actuating drive according to claim 1, wherein the second axle receiver is arranged between the two compound gears rotatably supported on the transmission axle.

4. The actuating drive of claim 1, wherein,
   the guide further includes a main body through which an opening extends having a circular cross-section having an inner contact surface at its inner circumference, configured to come into contact with the outside of the shaft of the output gear.

5. The actuating drive according to claim 4, wherein the guiding element includes a plurality of positioning and/or fixing elements configured to engage corresponding counterparts in the housing of the actuating drive to position and/or fix the guiding element within the housing.

6. The actuating drive according to claim 4, wherein the main body of the guide includes a receiving region having a circular cross-section configured to receive a compound gear of the transmission of the actuating drive rotatably supported on the transmission axle of the actuating drive.

7. An actuating drive, comprising
an electric motor, comprising a rotor rotatably supported on a rotor axle;
an output gear mechanically coupled to the rotor;
a transmission comprising a plurality of compound gears configured to mechanically couple the output gear to the rotor, wherein one of the compound gears is rotatably supported on the rotor axle, wherein two of the compound gears are rotatably supported on a transmission axle arranged offset with respect to the rotor axle, and wherein the transmission axle is of greater length than the rotor axle; and
a guiding element comprising a guide configured to radially guide the output gear relative to an output axis, wherein the guiding element includes a first axle receiver configured to receive a distal end of the rotor axle, and a second axle receiver configured to receive a central portion of the transmission axle wherein the second axle receiver is arranged between the two compound gears rotatably supported on the transmission axle.

* * * * *